(12) United States Patent
Lo

(10) Patent No.: US 8,417,104 B2
(45) Date of Patent: Apr. 9, 2013

(54) ZOOM BUTTON STRUCTURE

(75) Inventor: Huan-Chun Lo, Miaoli County (TW)

(73) Assignee: Altek Corporation, Hsinchu (TW)

( * ) Notice: Subject to any disclaimer, the term of this patent is extended or adjusted under 35 U.S.C. 154(b) by 110 days.

(21) Appl. No.: 13/208,365

(22) Filed: Aug. 12, 2011

(65) Prior Publication Data
US 2012/0308223 A1 Dec. 6, 2012

(30) Foreign Application Priority Data
May 31, 2011 (TW) .............................. 100119035 A

(51) Int. Cl.
*G03B 17/00* (2006.01)
(52) U.S. Cl. .......................................... 396/85; 396/543
(58) Field of Classification Search .................... 396/85, 396/543
See application file for complete search history.

(56) References Cited

U.S. PATENT DOCUMENTS

| 4,025,930 | A * | 5/1977 | Wolff | 396/29 |
| 5,970,261 | A * | 10/1999 | Ishiguro et al. | 396/85 |
| 6,018,632 | A * | 1/2000 | Takamura | 396/85 |
| 7,082,265 | B2 * | 7/2006 | Nishiwaki | 396/85 |
| 7,715,707 | B2 * | 5/2010 | Huang | 396/543 |
| 8,000,597 | B2 * | 8/2011 | Takeya et al. | 396/299 |
| 2002/0106203 | A1 * | 8/2002 | Taguchi et al. | 396/85 |
| 2012/0308223 | A1 * | 12/2012 | Lo | 396/543 |

* cited by examiner

*Primary Examiner* — W B Perkey
(74) *Attorney, Agent, or Firm* — Jianq Chyun IP Office

(57) ABSTRACT

A zoom button structure including a zoom button, a first middle band and a second middle band is provided. The first middle band has a first lock portion and a first body portion. The first lock portion extends from the first body portion and is located at a side of the zoom button. The second middle band has a second lock portion and a second body portion. The second lock portion extends from the second body portion and is located at the other side of the zoom button. Herein, the first lock portion and the second lock portion lock together and form an annular accommodating space. And the annular accommodating space surrounds and accommodates the zoom button.

9 Claims, 3 Drawing Sheets

ZOOM BUTTON STRUCTURE

CROSS-REFERENCE TO RELATED APPLICATION

This application claims the priority benefit of Taiwan application serial no. 100119035, filed May 31, 2011. The entirety of the above-mentioned patent application is hereby incorporated by reference herein and made a part of this specification.

BACKGROUND OF THE INVENTION

1. Field of the Invention

The invention relates to a zoom button structure. More particularly, the invention relates to a zoom button structure applicable to a portable electronic device such as a camera, a camcorder, or a mobile phone or the like.

2. Description of Related Art

Portable electronic device such as camera, camcorder or mobile phone in present-day often uses a middle band to fix the zoom button onto the main body of the portable electronic device so that users can conveniently adjust the focus. In general, the manufacturing process of the middle band is as follows: first fabricating mold, then injection molding and finally electroplating. However, the middle band is often in an irregular structure. That is, some holes or grooves to adapt with the electronic device such as zoom button, power plug hole and signal transmission plug hole are often disposed at the middle band. The more complicated the structure is, the complexity of the fabrication of mold would be increased. For injection molding, the required pressure holding time would be increased, and the cycle time and the complexity of the injection molding process are also increased if the molding structure is complicated. In addition, the larger the middle band, the higher the cost for molding is needed. The cycle time and the complexity of the injection molding process are also increased. Furthermore, the middle band is often in a slender structure and in a U-shaped or a quadrilateral frame. In general, the quality of the electroplating process would be decreased in the U-shaped electroplate, and it leads to the demand of improving the electroplating technique. The quality of the electroplating process is seriously decreased if the electroplate is a quadrilateral frame. Additionally, for the zoom button structure in present-day, components are separately formed and assembled. That is, besides the twisting element for zooming, a metal plate is further needed to screw up to the twisting element for zooming with a screw. After assembling such configuration, if the metal plate is exerted an external force, deformation is easy to occur due to the deficiency of the structural strength of the zoom button. And it may lead to loosening and quality of the whole electronic device becomes lower.

Specifically, for the conventional zoom button structure, the middle band is often an integrally formed electroplated middle band and the zoom button is the assembly of the metal plate and screw. Since many parts are needed and the structural strength is not enough in the conventional zoom button structure, the complexity, labor hour and cost of the fabricating process is increased.

SUMMARY OF THE INVENTION

The present invention provides a zoom button structure capable of simplifying the assembling process, improving the quality and structural strength and greatly decreasing the labor hour and production cost of the zoom button structure.

The present invention proposes a zoom button structure including a zoom button, a first middle band and a second middle band. The first middle band has a first lock portion and a first body portion. The first lock portion extends from the first body portion and located at a side of the zoom button. The second middle band has a second lock portion and a second body portion. The second lock portion extends from the second body portion and located at another side of the zoom button. Herein the first lock portion and the second lock portion lock together and form an annular accommodating space, and the annular accommodating space surrounds and accommodates the zoom button.

According to an embodiment of the present invention, the first lock portion and the second lock portion respectively have an arc-shaped protrusion at the inner side. The arc-shaped protrusion is adapted to support the zoom button to be accommodated in the annular accommodating space.

According to an embodiment of the present invention, the first lock portion has at least one protrusion and at least one recess at the inner side. And the second lock portion has at least one protrusion and at least one recess at the inner side.

According to an embodiment of the present invention, the protrusion of the first lock portion corresponds to the recess of the second lock portion, and the recess of the first lock portion corresponds to the protrusion of the second lock portion.

According to an embodiment of the present invention, when the zoom button, the first middle band and the second middle band lock together and form the zoom button structure, the zoom button structure is an enclosed structure or a non-enclosed structure having an opening.

According to an embodiment of the present invention, the material of the first middle band is metal, plastic, electroplated metal or electroplated plastic.

According to an embodiment of the present invention, the material of the second middle band is metal, plastic, electroplated metal or electroplated plastic.

According to an embodiment of the present invention, the zoom button structure further includes a shutter button and a twisting element for zooming. The shutter button is disposed at the zoom button and adapted for auto-focusing and image capturing. The twisting element for zooming is disposed at the zoom button and adapted for adjusting focus.

According to an embodiment of the present invention, the zoom button structure is adapted to dispose at a portable electronic device such as a camera, a camcorder, or a mobile phone, or the like.

In light of the above, in the embodiment of the present invention, since the middle band is designed apart into two and the zoom button is surrounded and accommodated in the annular accommodating space formed by the two middle bands, the quality of the injection molding and the electroplating process of the middle band can be greatly improved. And then, the zoom button structure is capable of simplifying the assembling process, improving the quality and structural strength and greatly decreasing the labor hour and production cost.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
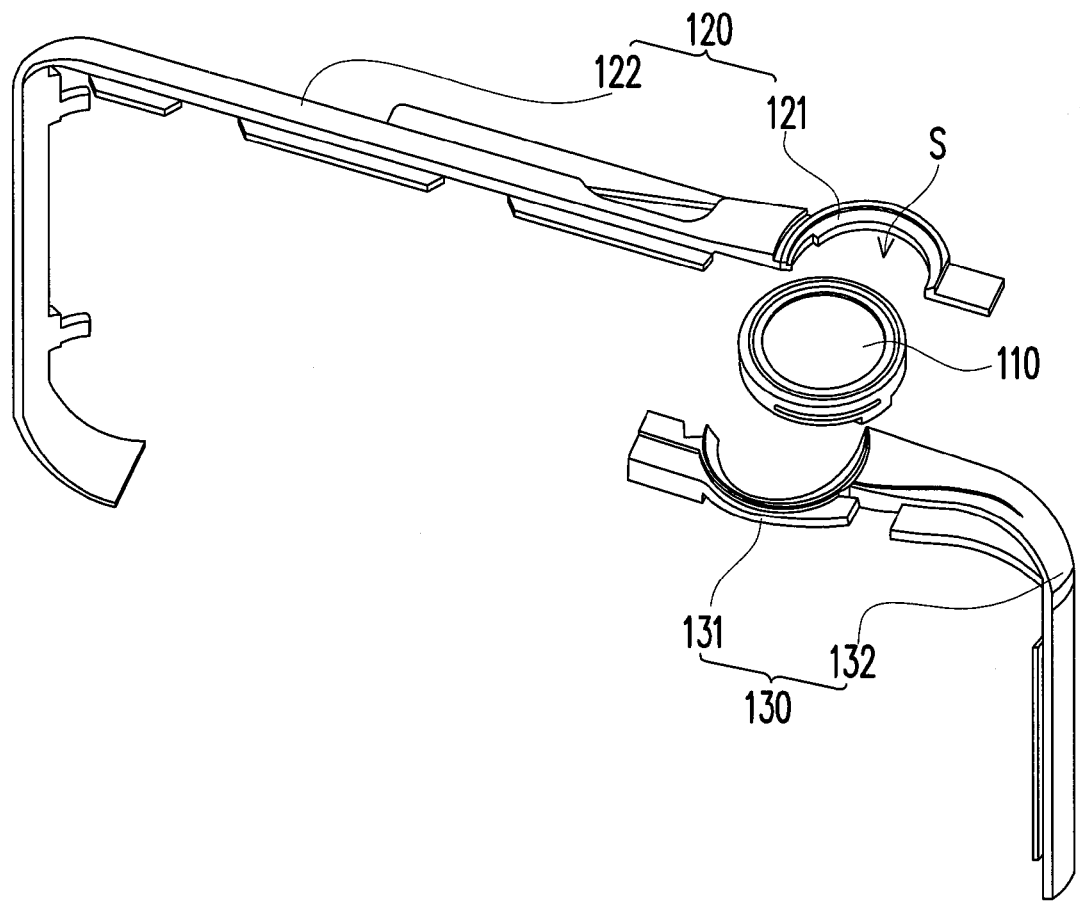
FIG. 1 is an exploded view illustrating a zoom button structure according to an embodiment of the present invention.

The zoom button structure provided in the present invention is applicable to a portable electronic device such as a camera, a camcorder, or a mobile phone or the like, so that the user can operate focusing, adjusting focus or pressing the shutter button for image capturing by using the zoom button. FIG. 1 is an exploded view illustrating a zoom button structure according to an embodiment of the present invention. Referring to FIG. 1, the zoom button structure 100 of the present embodiment includes a zoom button 110, a first middle band 120 and a second middle band 130. The first middle band 120 has a first lock portion 121 and a first body portion 122. The first lock portion 121 extends from the first body portion 122 and located at a side of the zoom button 121. The second middle band 130 has a second lock portion 131 and a second body portion 132. The second lock portion 131 extends from the second body portion 132 and located at another side of the zoom button 110. As shown in FIG. 1, in the present embodiment, the first lock portion 121 and the second lock portion 131 lock together and form an annular accommodating space S, and the annular accommodating space S surrounds and accommodates the zoom button 110.

As shown in FIG. 1, the middle band of the zoom button structure 100 is designed apart into two, ie., the first middle band 120 and the second middle band 130. The zoom button 110 is different from the conventional zoom button, the metal plate is unnecessary and it does not need to screw up. Hence, the structural strength of the zoom button structure 100 can be increased. In the present embodiment, since the first middle band 120 and the second middle band 130 are two separated components, the process of molding fabrication, injection molding and electroplating becomes much simpler. For example, the volume of the mold becomes less so that the complexity of the molding process is reduced. And the pressure holding time of the injection molding process becomes less and it also may lead to the reduction of the cycle time. The complexity of the electroplating process is decreased and thus the quality can be much improved. Therefore, more choices are available for the first middle band 120 and the second middle band 130. For example, in comparison to the conventional one-piece middle band, the two-part first middle band 120 and the second middle band 130 is much simpler in structure, and the volume is much smaller. The material of the first middle band 120 and the second middle band 130 can be metal, plastic, electroplated metal or electroplated plastic.

Furthermore, when the zoom button 110 is locked between the first lock portion 121 and the second lock portion 131, the zoom button structure 100 can be an enclosed structure or a non-enclosed structure having an opening. In the present embodiment, it is taken as an example that the zoom button structure 100 is a non-enclosed structure with an opening. When the zoom button 110, the first middle band 120 and the second middle band 130 lock together and form the zoom button structure 100, since an opening is formed between the ends of the first body portion 122 and the second body portion 132 because of being separated from one another at a distance, the zoom button structure 100 of FIG. 1 is a non-enclosed structure with an opening. In other embodiments, the lengths of first body portion 122 of the first middle band 120 and the second body portion 132 of the second middle band 130 can be designed longer, so that the ends of the first body portion 122 and the second body portion 132 can attach to each other to obtain an enclosed structure of the zoom button structure 100. For the conventional one-piece middle band, when the middle band is an enclosed structure the complexity of the process of molding, injection molding and electroplating would be increased. However, since the zoom button structure 100 is a two-part structure, both the enclosed or non-enclosed structure can achieve a good quality.

Figure 2:
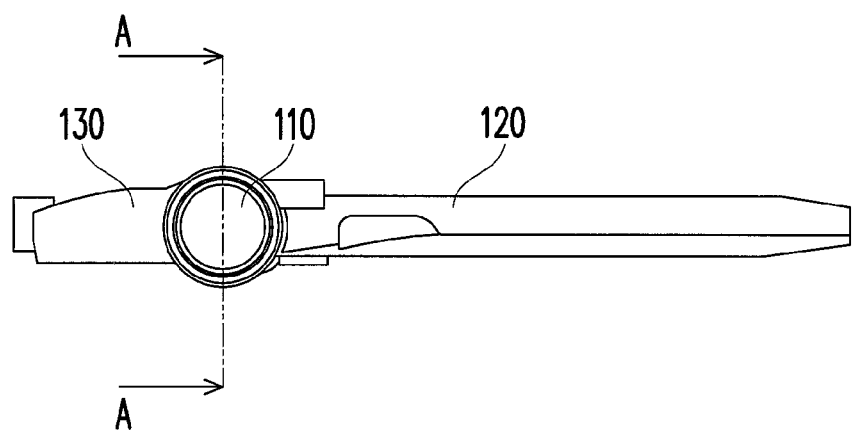
FIG. 2 illustrates a top view of the zoom button structure of FIG. 1.
Figure 3:
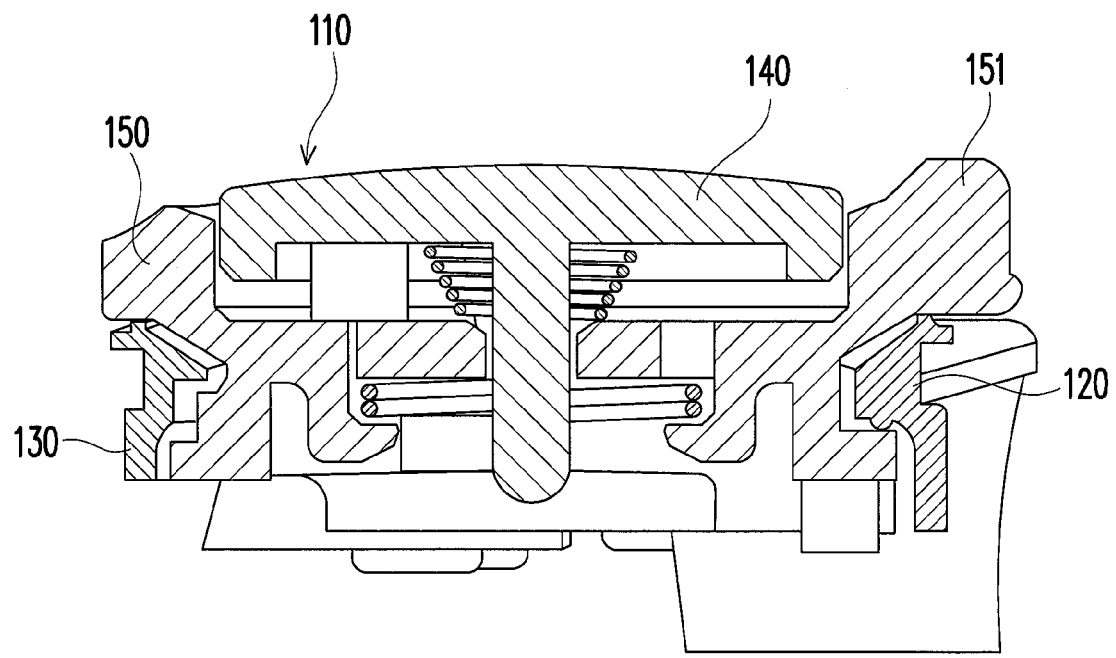
FIG. 3 illustrates a cross-sectional view of the zoom button structure of FIG. 2 along the line AA.

FIG. 2 illustrates a top view of the zoom button structure of FIG. 1. FIG. 3 illustrates a cross-sectional view of the zoom button structure of FIG. 2 along the line AA. Referring to FIG. 2 and FIG. 3 together, the zoom button structure further includes a shutter button 140 and a twisting element for zooming 150. The shutter button 140 is disposed upon the zoom button 110 and adapted for auto-focusing and image capturing. More specifically, as shown in FIG. 3, the structure of the shutter button 140 is, for example, designed by using a spring assembled to the structure of shutter button 140, so that users can softly press the shutter button 140 to operate the auto-focusing function and firmly press the shutter button 140 to capture image. The structure of twisting element for zooming 150 is, for example, designed by using a spring assembled to the structure of twisting element for zooming 150 with a knob 151, so that users can twist the knob 151 to the left or right for a predetermined distance to adjust the focus. The structure of the shutter button 140 and the twisting element for zooming 150 is not limited in present invention, and the zoom button structure button 110 can be designed according to different requirements.

Figure 4:
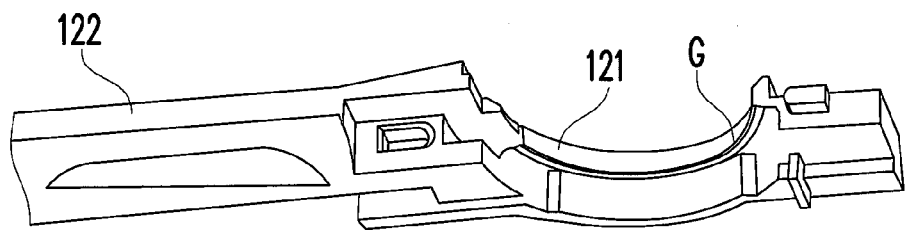
FIG. 4 illustrates a partial enlarged view of the first middle band of the zoom button structure of FIG. 1.
Figure 5:
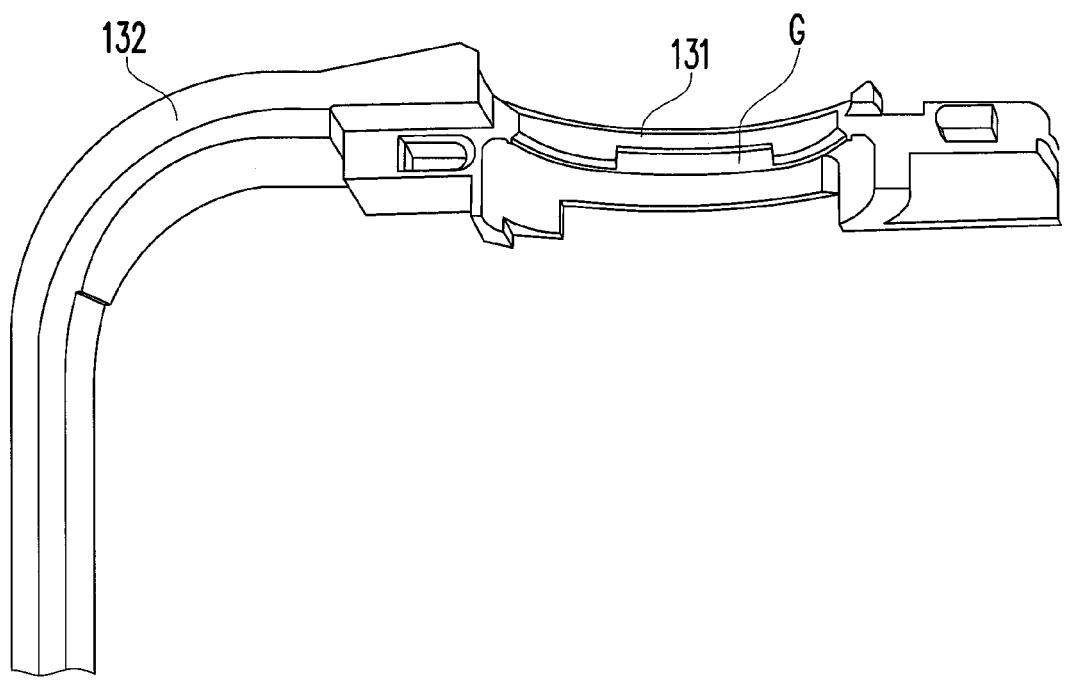
FIG. 5 illustrates a partial enlarged view of the second middle band of the zoom button structure of FIG. 1.

And then, the locking means of the first and second middle band 120, 130 and the zoom button 110 is described. FIG. 4 illustrates a partial enlarged view of the first middle band of the zoom button structure of FIG. 1. FIG. 5 illustrates a partial enlarged view of the second middle band of the zoom button structure of FIG. 1. Please refer to FIG. 1, FIG. 4 and FIG. 5. The first lock portion 121 of the first middle band 120 and the second lock portion 131 of the second middle band 130 respectively have an arc-shaped protrusion G at the inner side. The arc-shaped protrusion G is adapted to support the zoom button 110 to be accommodated in the annular accommodating space S. In other words, the arc-shaped protrusion G is adapted to support the edge of the zoom button 110, so that the twisting element for zooming 150 can be locked in the annular accommodating space S formed by the first lock portion 121 and the second lock portion 131 and twisted a predetermined arc length.

In the present embodiment, more specifically, the first lock portion 121 has at least one protrusion P and at least one recess R disposed at the inner side. Similarly, the second lock portion 131 has at least one protrusion P and at least one recess R disposed at the inner side. As shown in FIG. 4 and FIG. 5, as an example, the first lock portion 121 and the second lock portion 131 respectively have a protrusion P and a recess R. However, in other embodiments, the number and the location of the protrusion P and the recess R can be increased or decreased as required, it is not limited thereto. The protrusion P of the first lock portion 121 corresponds to the recess R of the second lock portion 131, and the recess R of the first lock portion 121 corresponds to the protrusion P of the second lock portion 131. Thus, the first lock portion 121 and the second lock portion 131 may lock together through the protrusions P and the corresponding recesses R, and form an annular accommodating space S, and the annular accommodating space S surrounds and accommodates the zoom button 110. It has to be noted that, though the zoom button 110 is accommodated in the annular accommodating space S, the twisting element for zooming 150 can be twisted a predetermined distance along the edge of the inner side, so that users can adjust the focus by twisting the knob 151 of the twisting element for zooming 150.

In light of the foregoing, since the middle band is designed apart into two and the zoom button is surrounded and accommodated in the annular accommodating space formed by the two middle bands, the quality of the injection molding and the electroplating process of the middle band can be greatly improved. And then, the zoom button structure is capable of simplifying the assembling process, improving the quality and structural strength and greatly decreasing the labor hour and production cost. Quality of a portable electronic device such as a camera, a camcorder or a mobile phone having camera function can be improved if disposing the provided zoom button structure to the portable electronic device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A zoom button structure, comprising:
a zoom button;
a first middle band having a first lock portion and a first body portion, the first lock portion extending from the first body portion and located at a side of the zoom button; and
a second middle band having a second lock portion and a second body portion, the second lock portion extending from the second body portion and located at another side of the zoom button,
wherein the first lock portion and the second lock portion lock together and form an annular accommodating space, and the annular accommodating space surrounds and accommodates the zoom button.

2. The zoom button structure as claimed in claim 1, wherein the first lock portion and the second lock portion respectively have an arc-shaped protrusion at the inner side, and the arc-shaped protrusion is adapted to support the zoom button to be accommodated in the annular accommodating space.

3. The zoom button structure as claimed in claim 1, wherein the first lock portion has at least one protrusion and at least one recess at the inner side, and the second lock portion has at least one protrusion and at least one recess at the inner side.

4. The zoom button structure as claimed in claim 3, wherein the protrusion of the first lock portion corresponds to the recess of the second lock portion, and the recess of the first lock portion corresponds to the protrusion of the second lock portion.

5. The zoom button structure as claimed in claim 1, wherein when the zoom button, the first middle band and the second middle band lock together and form the zoom button structure, the zoom button structure is an enclosed structure or a non-enclosed structure having an opening.

6. The zoom button structure as claimed in claim 1, wherein a material of the first middle band is metal, plastic, electroplated metal or electroplated plastic.

7. The zoom button structure as claimed in claim 1, wherein a material of the second middle band is metal, plastic, electroplated metal or electroplated plastic.

8. The zoom button structure as claimed in claim 1, further comprising a shutter button and a twisting element for zooming, the shutter button disposed at the zoom button and adapted for auto-focusing and image capturing, the twisting element for zooming disposed at the zoom button and adapted for adjusting focus.

9. The zoom button structure as claimed in claim 1, wherein the zoom button structure is adapted to dispose at a portable electronic device such as a camera, a camcorder, or a mobile phone.

* * * * *